United States Patent [19]

Hayashi et al.

[11] 4,216,680
[45] Aug. 12, 1980

[54] TRAVEL SPEED CHANGE APPARATUS FOR A FARM VEHICLE

[75] Inventors: Tetsuaki Hayashi; Hideo Shiiyama, both of Sennan; Mikio Kinoshita, Izumisano; Hiroshi Nagai, Sakai, all of Japan

[73] Assignee: Kubota, Ltd., Osaka, Japan

[21] Appl. No.: 935,308

[22] Filed: Aug. 21, 1978

[30] Foreign Application Priority Data

May 19, 1978 [JP] Japan ................. 53-60507
May 19, 1978 [JP] Japan ................. 53-60508

[51] Int. Cl.² ............................................ G05G 11/00
[52] U.S. Cl. ............................................... 74/473 R
[58] Field of Search ................................... 74/473 R

[56] References Cited

U.S. PATENT DOCUMENTS

| | | | |
|---|---|---|---|
| 2,329,354 | 9/1943 | McCarter | 74/473 X |
| 2,894,410 | 7/1959 | Libby | 74/473 R |
| 2,917,941 | 12/1959 | Wittren | 74/473 R |
| 2,947,190 | 8/1960 | Johnson | 74/473 X |
| 3,465,612 | 9/1969 | Letwin et al. | 74/473 R |
| 3,616,709 | 11/1971 | Malm | 74/473 R |
| 3,975,970 | 8/1976 | Eles et al. | 74/473 R |
| 4,068,540 | 1/1978 | Beckerman | 74/473 R X |
| 4,096,765 | 6/1978 | Cochran | 74/473 R |

FOREIGN PATENT DOCUMENTS

1222784  6/1960  France .................. 74/473 R

Primary Examiner—Roy D. Frazier
Assistant Examiner—Peter A. Aschenbrenner
Attorney, Agent, or Firm—Kane, Dalsimer, Kane, Sullivan and Kurucz

[57] ABSTRACT

A travel speed change apparatus for a farm vehicle in which a first speed change mechanism and a second speed change mechanism coact to change the travelling speed. The first and second speed change mechanisms are operable by manipulating a single hand lever movable in two different directions and not two independent levers. This single lever is adapted to actuate the first and second speed change mechanisms by moving in the same direction.

4 Claims, 12 Drawing Figures

TRAVEL SPEED CHANGE APPARATUS FOR A FARM VEHICLE

BACKGROUND OF THE INVENTION

1. Field of the Invention

This invention relates to a speed change apparatus for a farm vehicle in which a first speed change mechanism and a second speed change mechanism coact to change the travelling speed.

2. Description of the Prior Art

The first and second speed change mechanisms may be actuated independently by means of two hand levers respectively associated therewith. Such arrangement involves a trouble of changing a grip from one lever to the other and is liable to operational errors. To overcome such situation it is proposed to use only one lever operable in two different directions for actuating the two speed change mechanisms. In the known arrangement, the operation of the lever in a first direction actuates one of the speed change mechanisms and that in a second direction actuates the other speed change mechanism. Since both the first and second directions in which the lever is operated are associated with the actuation of the speed change mechanisms, a great operational force is required and the operation tends to lack smoothness. Further, this arrangement has a disadvantage in that the lever is not easily located for gripping when a speed change is intended because of a wide range of the lever movement in the first and second directions.

SUMMARY OF THE INVENTION

This invention intends to provide a travel speed change apparatus for a farm vehicle which is arranged that first and second speed change mechanisms are actuated by means of a single lever for an improvement operability and is capable of accurate and smooth speed changes overcoming the disadvantage found in the conventional form of actuating the two speed change mechanisms with a single hand lever. The travel speed change apparatus for a farm vehicle according to the invention comprises a first speed change mechanism and a second speed change mechanism co-operative to change travelling speed and is characterized in that, for actuating the two speed change mechanisms by means of a single hand lever movable in two different directions, a first speed change opeation course for actuating the first speed change mechanism is provided to orientate in a first direction, auxiliary operation courses are provided to extend in a second direction respectively from plural speed change positions of the first speed change operation course, and a plurality of second speed change operation courses for actuating the second speed change mechanism are provided to extend in the first direction respectively from the auxiliary operation courses.

To be more particular, in the arrangment in which the two speed change mechanisms are actuated by means of a single hand lever operable in two different directions, the first speed change operation course for actuating the first speed change mechanism and the second speed operation courses for actuating the second speed change mechanism are orientated in the same direction. Thus the lever operation requiring a great operational force is arranged in one direction, which facilitates operation of the two speed change mechanisms compared with the known arrangement in which the two speed change mechanisms are actuated by moving the lever in a first direction and a second direction respectively. The auxiliary operation courses for allowing the lever to move between the first and second speed change operation courses need not be long in the second direction. Therefore it is possible to provide a narrow range of the lever operation in the second direction, that is to say, the lever is operated within a small range in the second direction. Compared with the conventional wide range operation of the lever in the first and second directions, the arrangement of this invention makes it easy for the driver to locate the lever position. These effects and advantages amount to an accurate and smooth operation of the two speed change mechanisms by means of a single lever.

The object of this invention is to provide a travel speed change apparatus in which the two speed change mechanisms are operated in an excellent and trouble-free condition at all times.

Other objects and advantages of the invention will be apparent from the following description.

BRIEF DESCRIPTION OF THE DRAWINGS

In the drawings illustrating a travel speed change apparatus for a farm vehicle according to this invention.

DETAILED DESCRIPTION OF A PREFERRED EMBODIMENT

Figure 1:
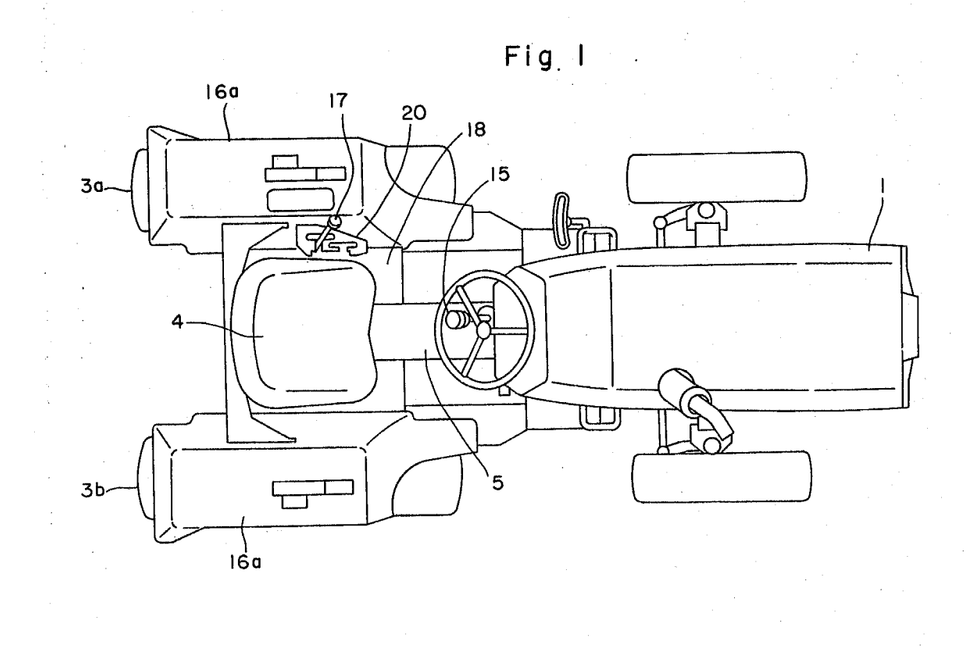
FIG. 1 is a plan view of a tractor.

In FIG. 1, a tractor is shown carrying an engine 2 on the forward part thereof covered with a bonnet 1 (see FIG. 2) and a driver's seat 4 on the rearward part thereof between a pair of rear wheels 3a and 3b.

Figure 2:
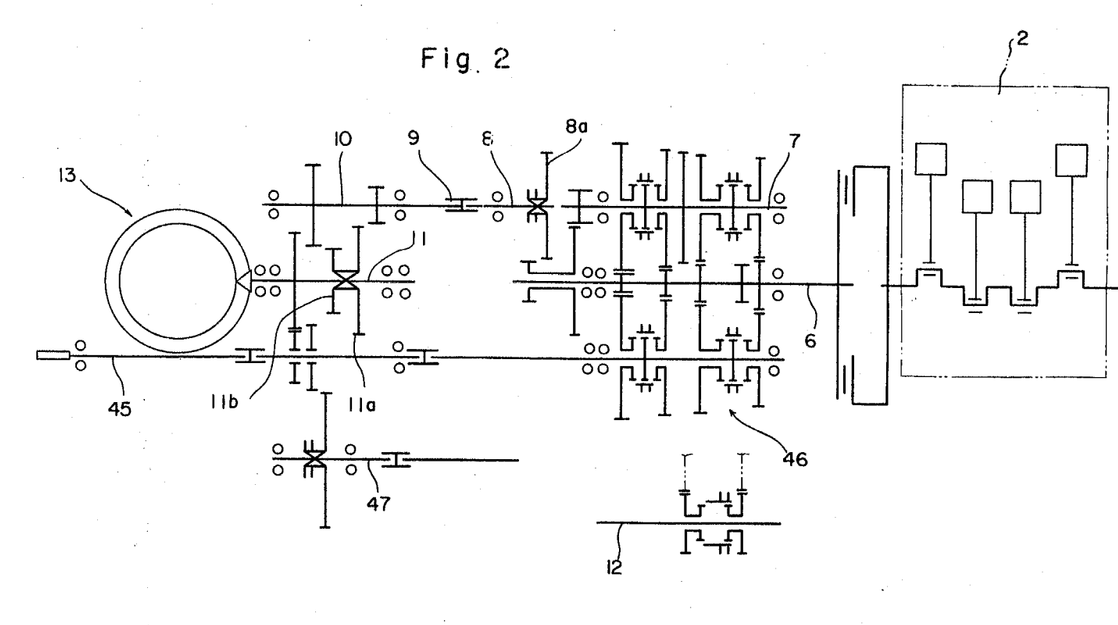
FIG. 2 is a diagram showing gear trains of the travel speed change apparatus.

A travel speed change apparatus is described hereinafter with reference to FIGS. 2 to 4.

A transmission case 5 disposed under the seat 4 receives an input shaft 6 to which power is transmitted from the engine 2, a first speed change shaft 7 parallel with input shaft 6, a second speed change shaft 8 coaxial with first speed change shaft 7, a third speed change shaft 10 coupled with second speed change shaft 8 through a joint 9, an output shaft 11 parallel with third speed change shaft 10, and a speed change shaft 12 for backward travel parallel with first speed change shaft 7. A differential means 13 for rear wheels 3a and 3b is mounted to interlock with output shaft 11.

The input shaft 6 carries fixed thereto a first forward speed gear 6a, a second forward speed gear 6b, a third forward speed gear 6c, a fourth forward speed gear 6d and a reversing gear 6e. The first speed change shaft 7 carries, for free rotation axially thereof, first, second, third and fourth speed change gears 7a, 7b, 7c and 7d to mesh with the forward gears 6a, 6b, 6c and 6d secured on the input shaft 6. There are gears 7e and 7f fixedly mounted on speed change shaft 7 respectively between the first and second speed change gears 7a, 7b and between the third and fourth speed change gears 7c, 7d. Outer peripheries of these gears 7e and 7f are in mesh with internally threaded gears 14a and 14b adapted to move in the axial directions into and out of engagement with a base portion of each of the speed change gears 7a . . . The speed change shaft 12 for backward travel carries, for free rotation axially thereof, a gear 12a to mesh with reversing gear 6e fixed on the input shaft 6 and a backward speed change gear 12b to mesh with a gear 7g fixedluy mounted on the first speed change shaft 7. The outer periphery of a base portion of the gear 12a is in mesh with an internally threaded gear 14c adapted to move in the axial directions into and out of engagement with the outer periphery of a base portion of the backward speed change gear 12b.

The foregoing arrangement provides a primary speed change mechanism adapted to give four forward speeds F1, F2, F3 and F4 and a backward travel R by selectively shifting to internally threaded gears 14a, 14b and 14c.

The input shaft 6 carries an axially rotatable gearing consisting of a large diameter gear 6f and a small diameter gear 6g in integral formation, gear 6f being at all times in mesh with a gear 7h fixedly mounted on the first speed change shaft 7 and gear 6g being adapted to mesh with a slide gear 8a splined on the second speed change shaft 8. By moving in the axial directions, gear 8a is adapted to switch between a position to mesh with small diameter gear 6g and a position to engage a spline at the end of first speed change shaft 7.

Such arrangement constitutes a first auxiliary speed change mechanism adapted to give two step travel speeds with a great speed change ratio by shifting the slide gear 8a.

The output shaft 11 is splined with a slide gearing consisting of a large diameter gear 11a and a small diameter gear 11b in integral formation, gear 11a being adapted to mesh with a gear 10a fixedly mounted on third speed change shaft 10 and gear 11b being adapted to mesh with a gear 10b fixedly mounted on third speed change shaft 10.

Such constitutes a second auxiliary speed change mechanism to give two step travel speeds by shifting slide gears 11a and 11b.

Accordingly, the travel speed change apparatus of this invention is adapted to give sixteen step forward travel speeds and two step backward travel speeds by a combined action of the primary speed change mechanism, the first auxiliary speed change mechanism and the second auxiliary speed change mechanism.

The operation of the travel speed change apparatus is described now.

Figures 3, 12:
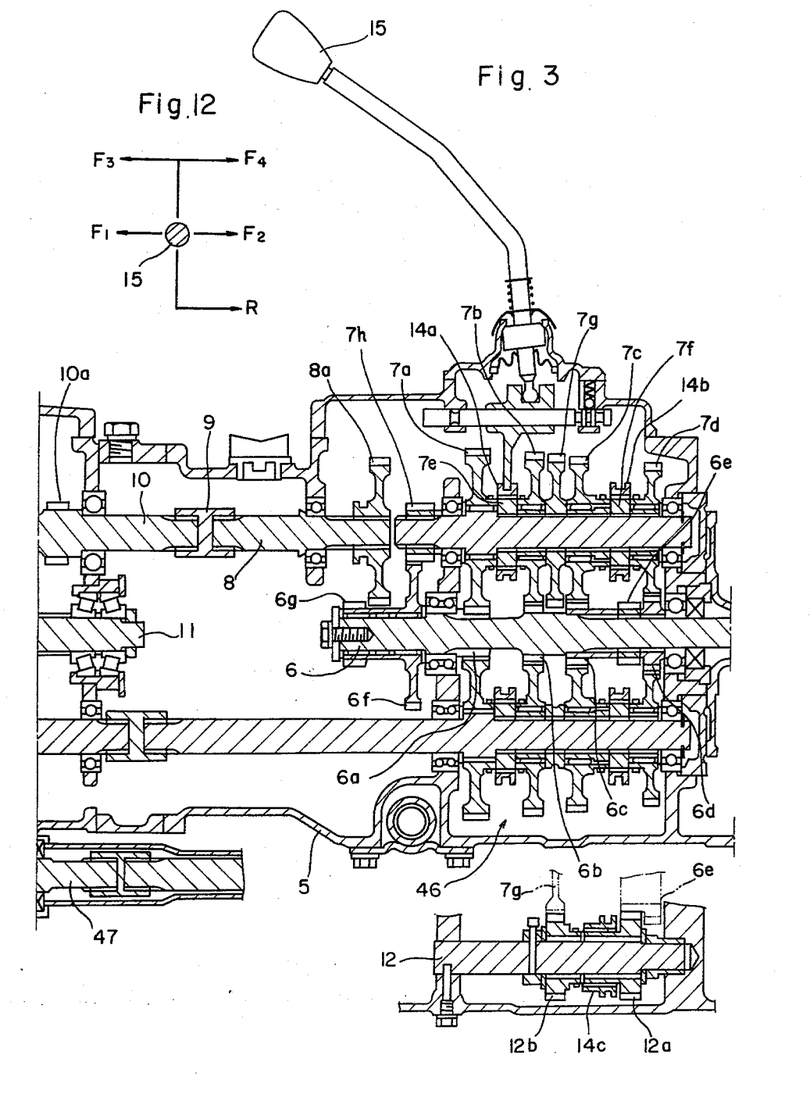
FIG. 3 is a developed vertical section showing the forward interior of a transmission case.
FIG. 12 is a diagram showing operation courses for a primary speed change lever.
Figure 4:
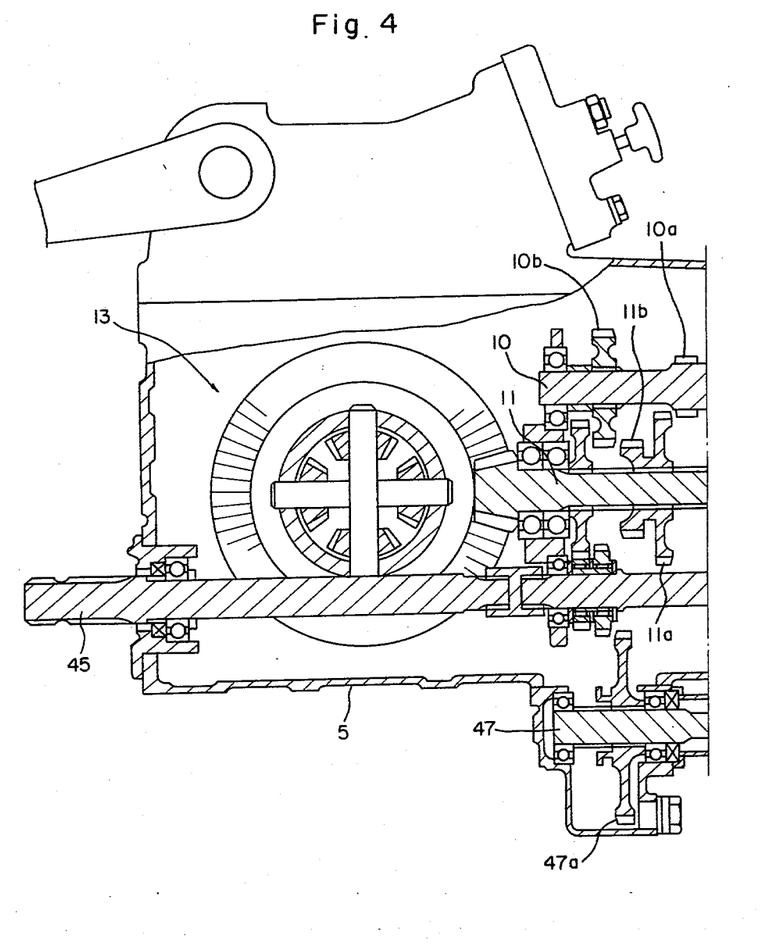
FIG. 4 is a developed vertical section showing the rearward interior of the transmission case.

Regarding the primary speed change mechanism briefly, its operation is carried out by oscillating a primary speed change lever 15 pivotally attached to a top portion of transmission case 5 in a combination of forward, rearward and sideward directions (see FIG. 12). The first and second auxiliary speed change mechanisms are operated by means of a single hand lever 17 disposed at a position inwardly towards the tractor body of the left one 16b of fenders 16a and 16b covering the pair of rear wheels 3a and 3b, which is described hereinafter with reference to FIGS. 5 to 8.

Figure 9:
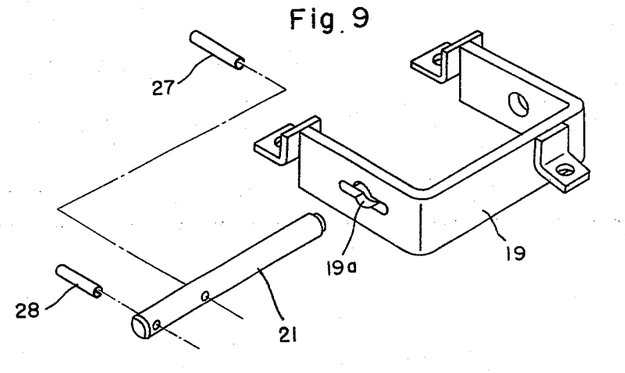
FIG. 9 is an exploded perspective view showing an axis and a U-shaped frame.

A U-shaped frame 19 (see FIG. 9) is bolted to a cover plate 18 covering an upper lateral portion of transmission case 5 (see FIG. 1). A guide frame 20 for lever 17 (see FIG. 8) has a lower portion held tight with U-shaped frame 19 and an upper portion bolted to a side face of fender 16b. An axis 21 is provided to penetrate frame 19 (see FIG. 9) and to extend along the side of the tractor body. The axis 21 carries, rotatably thereon, a first link member 22 associated with the first auxiliary speed change mechanism, a second link member 23 associated with the second auxiliary speed change mechanism and a support member 25 adapted to pivotally support a U-shaped member 24 connected to a root portion of lever 17, the U-shaped member 24 being permitted to oscillate only about an axis extending in the forward-rearward direction. On axis 21 between the first link member 22 and support member 25 is a tubular member 26 fixedly attached by means of a roll pin 27 (see FIG. 9) penetrating tubular member 26 and axis 21, and thus there is no axial movement or rotation of tubular member 26. The axis 21 is penetrated by a roll pin 28 (see FIG. 9) at an end portion, which pin 28 fits in an opening 19a defined in the U-shaped frame 19, thereby preventing axial rotation of axis 21. The tubular member 26 has one end received and supported by the first link member 22 which is in abutment with the inner face of U-shaped frame 19 and the other end received and supported by support member 25 abutting with and supported by the second link member 23 which is in abutment with the inner face of U-shaped frame 19, whereby the tubular member 26 is prevented from axial movement.

A shift fork 29 to engage slide gear 8a of the first speed change mechanism is pivoted oscillatably about a vertical axis to the tip end of an oscillatable arm 31 fixed to the end of a vertical axis 30 disposed inside transmission case 5, which vertical axis 30 is supported by transmission case 5 for axial rotation. To the end of vertical axis 30 disposed outside transmission case 5 is fixed an oscillatable arm 32 which is operatively connected to the first link member 22 through a link 33. Thus, slide gear 8a is shifted by oscillating the first link member 22 in forward and rearward directions. The shift fork 29 has been made into a desired shape first by blanking a sheet material to define a bifurcate portion 29a to engage slide gear 8a and then by a bending process to define a pivotal portion 29b to receive oscillatable arm 31 (see FIG. 10).

A shift fork 34 to engage slide gears 11a and 11b of the second auxiliary speed change mechanism is supported by a shift fork axis 35 movably in the axial directions. A cross axis 36 rotatably supported by transmission case 5 has one end disposed inside case 5 and securely carrying an oscillatable arm 37 engaging shift fork 34, and the other end disposed outside case 5 and securely carrying an oscillatable arm 38 which is operatively connected to the second link member 23 through a link 39. Thus, slide gears 11a and 11b are shifted by oscillating the second link member 23 in forward and rearward directions.

The first link member 22 is provided with a cut-out 22a to receive and engage lever 17 oscillated sideways. The second link member 23 is provided with two cut-outs 23a and 23b to receive and engage lever 17 oscillated sideways respectively from speed change positions Q1 and Q2 into which lever 17 has been placed in oscillating the first link member 22 forwardly or rearwardly.

Figures 5, 8:
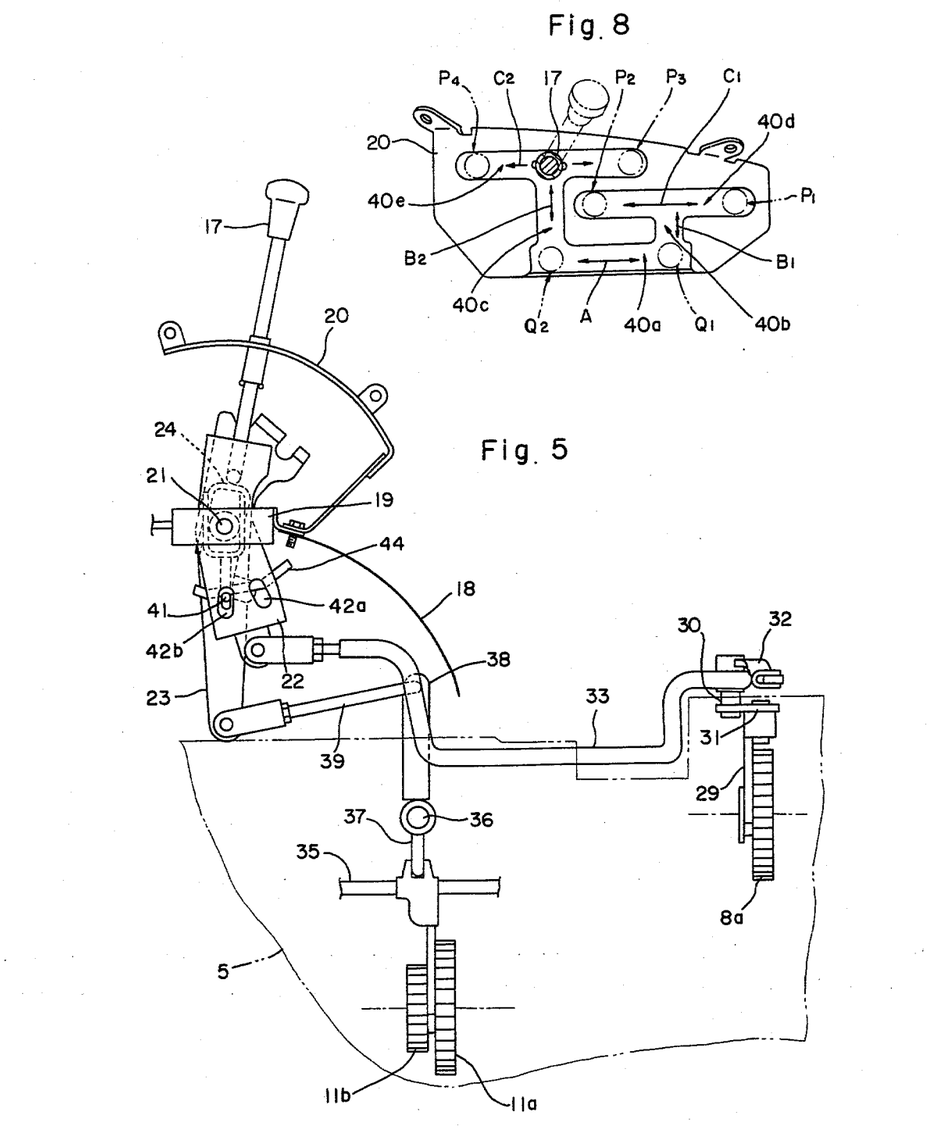
FIG. 5 is a side view showing how a hand lever and first and second speed change mechanisms are linked.
FIG. 8 is a plan view of a guide frame.
Figures 6, 10:
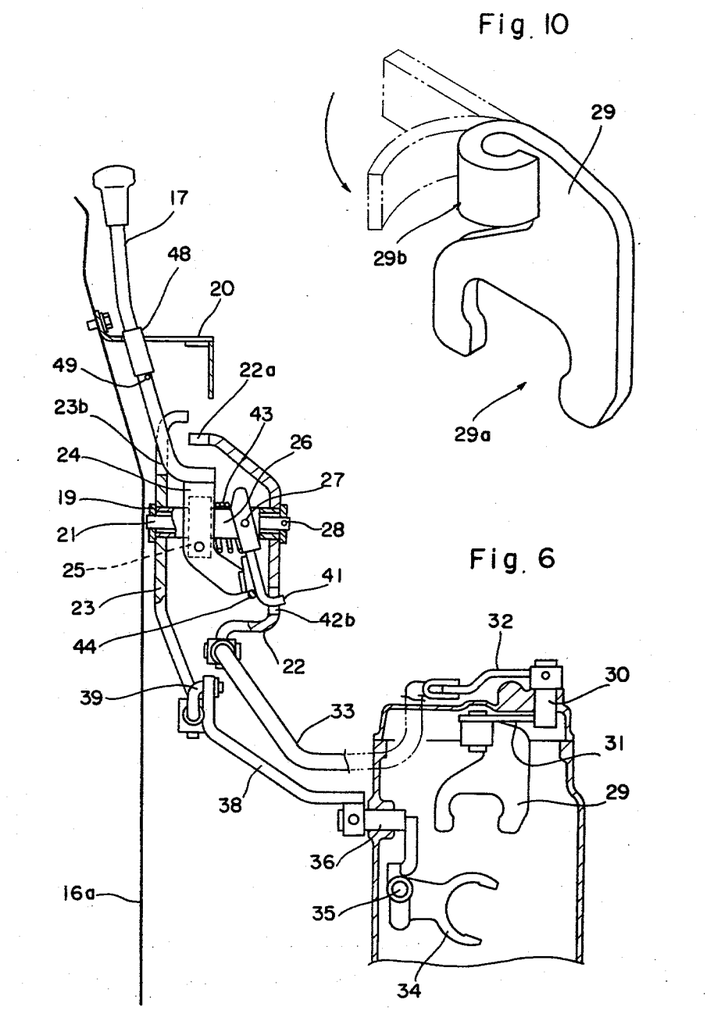
FIG. 6 is a rear view of the part shown in FIG. 5.
FIG. 10 is a perspective view of a shift fork.
Figure 7:
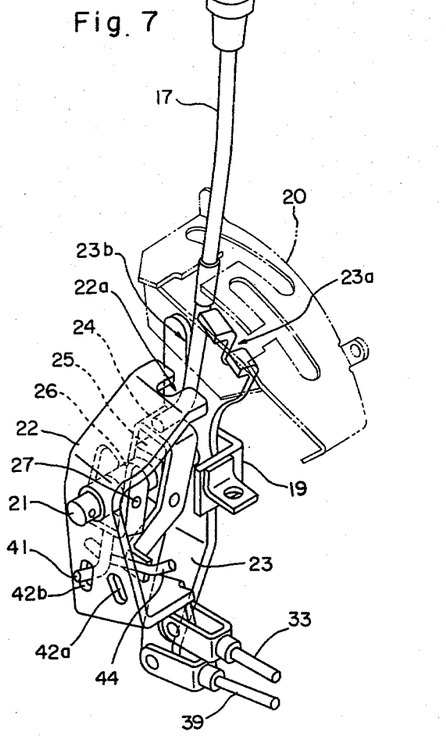
FIG. 7 is a schematic perspective view showing a lever mounting portion.

Guide frame 20 includes a first speed change guide groove 40a defined in the forward-rearward direction to guide lever 17 in a first direction which is the forward-rearward direction for actuating the first auxiliary speed change mechanism. From speed change positions Q1 and Q2 which correspond to the forward and rearward ends of first speed change guide groove 40a, auxiliary guide grooves 40b and 40c extend sideways to guide lever 17 in a second direction which is the sideward direction, respectively. Respective ends of these extensions are joined by second speed change guide grooves 4d and 4e to guide lever 17 in the first direction, i.e. the forward-rearward direction, for actuating the second auxiliary speed change mechanism.

According to the above arrangement, the first auxiliary speed change mechanism is actuated through oscillation of the first link member 22 by oscillating lever 17 forwardly and rearwardly along a first speed change operation course A defined by first speed change guide groove 40a. From speed change positions Q1 and Q2 of the first auxiliary speed change mechanism corresponding to the forward and rearward ends of course A, lever 17 is oscillated sideways along auxiliary operation courses B1 and B2 defined by auxiliary guide grooves 40b and 40c. Then, the second axiliary speed change mechanism is actuated by oscillating lever 17 forwardly and rearwardly along second speed change operation courses C1 and C2 defined by second speed change guide grooves 40d and 40e to speed change positions P1, P2 and P3, P4 corresponding to the forward and rearward ends of each of the courses C1 and C2.

When lever 17 is in engagement with second link member 23 leaving first link member 22 unengaged, the latter may oscillate inadvertently and cause trouble. In order to prevent such, the following check mechanism is provided.

A check metal piece 41 is pivoted to roll pin 27 attaching tubular member 26 to axis 21. This check metal piece 41 is arranged sideways oscillatable between a check position to stop oscillation of the first link member 22 by engaging an opening 42a or an opening 42b defined on the first link member 22 and a release position not engaging opening 42a or 42b, and is biased towards the release position by a spring 43. U-shaped member 24 connected to lever 17 carries at the tip end thereof a pin 44 to abut with check metal piece 41 and press it towards the check position.

When lever 17 which has been moved along first speed change operation course A is oscillated sideways along auxiliary operation course B1 or B2, the pin 44 presses against check metal piece 41 to cause sideways oscillation thereof. Thereupon metal piece 41 enters opening 42a and 42b and serves to prevent inadvertent oscillation of first link member 22.

Figure 11:
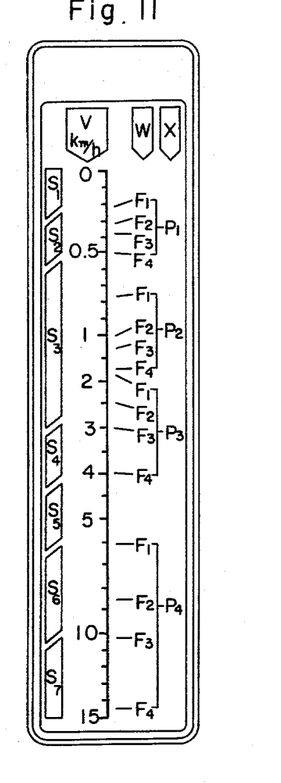
FIG. 11 is a plan view of a speed indicator panel.

FIG. 11 shows an indicator panel mounted on the tractor adjacent to the driver's seat 4 for indicating forward travel speed conditions of the travel speed change apparatus. Under mark V is a graduated indication for the forward travel speeds, under mark W are marks F1, F2, F3 and F4 indicating the speed change conditions provided by the primary speed change mechanism, and under mark X are marks P1, P2, P3 and P4 indicating the speed change conditions provided by the first and second auxiliary speed change mechanisms. Marks F1 ... and P1 ... correspond to the speed change positions already described. The indicator panel includes, beside the speed indication, marks S1 ... for speed ranges which facilitate selection of suitable speeds for operations involving various implements mounted on the tractor. Of these marks, S1 shows the speed range suitable for digging operation, S2 for planting operation, S3 for rotary plowing operation, S4 for field levelling operation, S5 for reaping operation, S6 for spade plowing operation and S7 for travelling on the road.

In the drawings, reference 45 indicates a power take-off shaft to which power is transmitted from input shaft 6 in four speeds by means of a gear speed change mechanism 46. Reference 47 indicates a transmission shaft for driving the front wheels of the tractor. The transmission shaft 47 is operatively connected to output shaft 11 by means of gears and is arranged to become disconnected from output shaft 11 by axially moving a slide gear 47a. Reference 48 indicates a tubular element made of rubber or plastics fitted on lever 17 to serve as buffer in the abutment between lever 17 and guide frame 20, the tubular element 48 being held in position by a boss 49 provided on lever 17.

While, in the foregoing embodiment, the first auxiliary speed change mechanism functioning as first speed change mechanism and the second auxiliary speed change mechanism are described as effecting a two step speed change respectively, it is of course possible to arrange that each of these speed change mechanisms effect a speed change of three or more steps.

Furthermore, in the described embodiment, the plural number of second speed change operation courses C1 and C2 are disposed parallel with one another so as to partly overlap in the forward-rearward or first direction with a suitable distance therebetween in the sideward or second direction, whereby lever 17 is operated within a small range in the first direction. Such arrangement may be modified so that the plural second operation courses C1 and C2 be aligned in the first direction to minimize the range within which lever 17 is operated in the second direction.

The disposition of the first direction to agree with the forward-rearward direction relative to the tractor body as described has the advantage of facilitating the manipulation of lever 17 since it is in such direction that the driver finds it easy to exert his force.

The described embodiment includes no check mechanism for the second link member 23 which is engagement with lever 17 most of the time. However, the second link member 23 may be provided with a check mechanism.

What we claim is:

1. A travel speed change apparatus for a farm vehicle comprising a first speed change mechanism and a second speed change mechanism co-operative to change travelling speed, characterized in that, for actuating said two speed change mechanisms by means of a single hand lever (17) movable in two different directions, a first speed change operation course (A) for actuating said first speed change mechanism is provided to orientate in a first direction, auxiliary operation courses (B1), (B2) are provided to extend in a second direction respectively from plural speed change positions (Q1), (Q2) of said first speed change operation course (A), and a plurality of second speed change operation courses (C1), (C2) for actuating said second speed change mechanism are provided to extend in thr first direction respectively from said auxiliary operation courses (B1), (B2).

2. A travel speed change apparatus for a farm vehicle as claimed in claim 1 wherein said layer (17) is adapted to engage a first link member (22) connected to said first speed change mechanism or a second link member (23) connected to said second speed change mechanism by moving along said auxiliary operation courses (B1), (B2) into said first speed change operation course (A) or said second speed change operation courses (C1), (C2), whereupon movement of said lever (17) along said first speed change operation course (A) shifts said first link member (22) to actuate said first speed change mechanism and movement of said lever (17) along said second speed change operation courses (C1), (C2) shifts said second link member (23) to actuate said second speed change mechanism, and a mechanism for checking shift of said first link member (22) is provided, said check mechanism being operative with movement of said lever (17) from said first speed change operation course (A) along said auxiliary operation courses (B1), (B2) into said second speed change operation courses (C1), (C2) to switch automatically and reversibly from a release position to a check position.

3. A travel speed change apparatus for a farm vehicle as claimed in claim 1 or 2 wherein said first direction is substantially in agreement with the forward-rearward direction relative to the vehicle body, and said plural second operation courses (C1), (C2) are disposed parallel with one another so as to partly overlap in the first direction with a suitable distance therebetween in the second direction.

4. A travel speed change apparatus for a farm vehicle as claimed in claim 1 or 2 wherein said first direction is substantially in agreement with the forward-rearward direction relative to the vehicle body, and said plural second operation courses (C1), (C2) are aligned in said first direction.

* * * * *

UNITED STATES PATENT AND TRADEMARK OFFICE
CERTIFICATE OF CORRECTION

PATENT NO. : 4,216,680
DATED : August 12, 1980
INVENTOR(S) : Tetsuaki Hayaski et al.

It is certified that error appears in the above—identified patent and that said Letters Patent is hereby corrected as shown below:

Column 1, line 37, "improvement" should be --improved--;

line 48, "opeation" should be --operation--;

Column 3, line 17, "fixedluy" should be --fixedly--;

Column 6, line 66, "thr" should be --the--;

Column 7, line 2, "layer" should be --lever--.

Signed and Sealed this

Eighteenth Day of November 1980

[SEAL]

Attest:

SIDNEY A. DIAMOND

Attesting Officer     Commissioner of Patents and Trademarks